United States Patent
Ewing et al.

[11] Patent Number: 6,161,893
[45] Date of Patent: *Dec. 19, 2000

[54] SUNSHADE FOR AN AUTOMOTIVE VEHICLE ROOF

[75] Inventors: Kip A. Ewing, Dearborn; Richard D. George, Riverview, both of Mich.

[73] Assignee: ASC Incorporated, Southgate, Mich.

[ * ] Notice: This patent is subject to a terminal disclaimer.

[21] Appl. No.: 09/324,142

[22] Filed: Jun. 2, 1999

Related U.S. Application Data

[63] Continuation of application No. 08/779,922, Jan. 6, 1997, Pat. No. 6,015,184, which is a continuation of application No. PCT/US94/07717, Jul. 5, 1994.

[51] Int. Cl.$^7$ ............................................. B60J 7/06
[52] U.S. Cl. ......................... 296/152; 296/98; 296/214
[58] Field of Search ........................... 296/147, 152, 296/146.16, 97.1, 97.4, 97.8, 98, 214, 219; 160/270, 214

[56] References Cited

U.S. PATENT DOCUMENTS

| | | |
|---|---|---|
| 148,555 | 3/1874 | Ferguson . |
| 170,034 | 11/1875 | Walbridge . |
| 700,362 | 5/1902 | Niehaus . |
| 817,562 | 4/1906 | Holden . |
| 1,079,205 | 11/1913 | Beebe . |
| 1,393,405 | 10/1921 | Soteros et al. . |
| 1,406,499 | 2/1922 | Sanberg . |
| 1,413,424 | 4/1922 | Peczenik . |
| 1,421,181 | 6/1922 | Decker . |
| 1,425,484 | 8/1922 | Jenkins . |
| 1,427,038 | 8/1922 | Toadvine . |
| 1,441,501 | 1/1923 | Hein . |
| 1,455,475 | 5/1923 | Bullock . |
| 1,461,478 | 7/1923 | Daniels . |
| 1,637,763 | 8/1927 | Clegg . |
| 1,677,287 | 7/1928 | Naumburg . |
| 1,703,395 | 2/1929 | House . |
| 1,738,060 | 12/1929 | Barnes . |
| 1,839,727 | 1/1932 | Austin . |
| 1,860,463 | 5/1932 | Kaplan et al. . |
| 1,878,943 | 9/1932 | Locke et al. . |
| 1,885,510 | 11/1932 | Chapman . |
| 1,922,545 | 8/1933 | Locke et al. . |
| 1,963,830 | 6/1934 | Corbert . |
| 2,094,932 | 10/1937 | Swan . |
| 2,115,432 | 4/1938 | Simon . |
| 2,248,538 | 7/1941 | Liebler ........................................ 296/98 |
| 2,328,263 | 8/1943 | Stefano . |
| 2,561,188 | 7/1951 | Ferguson . |
| 2,580,776 | 1/1952 | Herman . |

(List continued on next page.)

FOREIGN PATENT DOCUMENTS

| | | | |
|---|---|---|---|
| 1269220 | 7/1961 | France ........................................ 296/214 |
| 19 46 161 | 1/1978 | Germany . |
| 3802379 A1 | 8/1988 | Germany . |
| 3923-122 | 3/1990 | Germany ..................................... 296/214 |
| 61-155020 | 7/1986 | Japan . |
| 63-0258213 | 10/1988 | Japan . |
| 63-0263133 | 10/1988 | Japan . |
| 63-258213 | 10/1988 | Japan ......................................... 296/214 |
| 63-263133 | 10/1988 | Japan ......................................... 296/214 |
| 63-269719 | 11/1988 | Japan ......................................... 296/214 |
| 2-274616 | 11/1990 | Japan ......................................... 296/214 |
| 5-4521 | 1/1993 | Japan . |
| 5-24437 | 2/1993 | Japan . |
| 328397 | 5/1930 | United Kingdom . |
| 455874 | 11/1936 | United Kingdom ....................... 296/214 |
| 90/00986 | 2/1990 | WIPO ......................................... 296/214 |

OTHER PUBLICATIONS

English Translation of Japanese Patent No. 63–258213.

*Primary Examiner*—D. Glenn Dayoan
*Assistant Examiner*—Jason Morrow
*Attorney, Agent, or Firm*—Harness, Dickey & Pierce, P.L.C.

[57] ABSTRACT

A sunshade (42) for substantially covering an automotive vehicle roof (32) has a plurality of roof bows (70 and 72) and a flexible sheet (50) spanning between these bows, all of which are slidably disposed proximate with an inside surface (40) of the roof (32).

32 Claims, 7 Drawing Sheets

U.S. PATENT DOCUMENTS

| | | |
|---|---|---|
| 2,585,769 | 2/1952 | Hamlin . |
| 2,594,813 | 4/1952 | Seibert . |
| 2,594,910 | 4/1952 | Germann ................................... 296/98 |
| 2,723,714 | 11/1955 | Moore . |
| 2,747,927 | 5/1956 | Burkhead . |
| 2,855,241 | 10/1958 | Walter . |
| 2,861,836 | 11/1958 | Goeggel . |
| 2,874,770 | 2/1959 | Rohr et al. . |
| 2,921,628 | 11/1960 | Alvarez . |
| 2,927,819 | 3/1960 | Johnson . |
| 2,973,990 | 3/1961 | Werner . |
| 3,075,805 | 1/1963 | Golde et al. . |
| 3,183,033 | 5/1965 | Stulbach . |
| 3,363,666 | 1/1968 | Hodgson et al. . |
| 3,412,506 | 11/1968 | Shiota . |
| 3,445,135 | 5/1969 | Masi . |
| 3,584,910 | 6/1971 | Lupul . |
| 3,658,378 | 4/1972 | Sutren . |
| 3,739,832 | 6/1973 | Sivin . |
| 3,819,227 | 6/1974 | Carli . |
| 3,964,784 | 6/1976 | Prechter et al. . |
| 4,018,476 | 4/1977 | Lutz et al. . |
| 4,066,292 | 1/1978 | Carli . |
| 4,068,885 | 1/1978 | Berger . |
| 4,118,066 | 10/1978 | Ricke . |
| 4,143,907 | 3/1979 | Ireland . |
| 4,157,845 | 6/1979 | Queveau . |
| 4,175,784 | 11/1979 | Schaltzler et al. . |
| 4,220,189 | 9/1980 | Marquez . |
| 4,274,672 | 6/1981 | Kuroda ................................... 296/214 |
| 4,312,533 | 1/1982 | Jardin et al. . |
| 4,320,921 | 3/1982 | Schatzler . |
| 4,335,773 | 6/1982 | Masi . |
| 4,337,975 | 7/1982 | Tamamushi et al. . |
| 4,420,184 | 12/1983 | Kaltz . |
| 4,422,686 | 12/1983 | Droz . |
| 4,428,412 | 1/1984 | Toro . |
| 4,458,739 | 7/1984 | Murray et al. . |
| 4,558,899 | 12/1985 | Chu et al. . |
| 4,597,430 | 7/1986 | Marquez . |
| 4,610,292 | 9/1986 | Hausmann et al. . |
| 4,619,480 | 10/1986 | Motoyama et al. . |
| 4,638,844 | 1/1987 | Hayashiguchi . |
| 4,647,102 | 3/1987 | Ebrahimzadeh . |
| 4,671,564 | 6/1987 | Sumida et al. . |
| 4,674,789 | 6/1987 | Watjer et al. . |
| 4,679,846 | 7/1987 | Lux et al. . |
| 4,695,090 | 9/1987 | Draper . |
| 4,702,297 | 10/1987 | Van Klompenburg . |
| 4,702,518 | 10/1987 | Paerisch et al. . |
| 4,707,018 | 11/1987 | Gavagan . |
| 4,717,200 | 1/1988 | Kruger . |
| 4,792,178 | 12/1988 | Kokx . |
| 4,828,319 | 5/1989 | Benson . |
| 4,852,938 | 8/1989 | Hirschberg et al. . |
| 4,872,722 | 10/1989 | Farmont ................................... 296/214 |
| 4,911,496 | 3/1990 | Fuerst . |
| 4,923,244 | 5/1990 | Clenet . |
| 5,005,899 | 4/1991 | Clenet . |
| 5,018,783 | 5/1991 | Chamings et al. . |
| 5,029,937 | 7/1991 | Yamamoto . |
| 5,033,789 | 7/1991 | Hayashi et al. . |
| 5,052,747 | 10/1991 | Kubota et al. . |
| 5,076,633 | 12/1991 | Hsu et al. . |
| 5,133,585 | 7/1992 | Hassan . |
| 5,147,107 | 9/1992 | Yamauchi et al. . |
| 5,184,870 | 2/1993 | Bauhof . |
| 5,197,779 | 3/1993 | Mizuno et al. . |
| 5,250,882 | 10/1993 | Odoi et al. . |
| 5,261,722 | 11/1993 | Staley et al. . |
| 5,941,598 | 8/1999 | Caye et al. . |
| 5,951,100 | 9/1999 | Ewing et al. . |
| 6,015,184 | 1/2000 | Ewing et al. ........................... 296/219 |

Fig-19

SUNSHADE FOR AN AUTOMOTIVE VEHICLE ROOF

CROSS REFERENCE TO RELATED APPLICATIONS

This application is a continuation of U.S. patent application Ser. No. 08/779,922, filed Jan. 6, 1997, now U.S. Pat. No. 6,015,184, which is a continuation of PCT Application Ser. No. PCT/US94/07717, filed Jul. 5, 1994, Publication No. WO/96/01191.

BACKGROUND AND SUMMARY OF THE INVENTION

This invention relates generally to sunshades and specifically to a sunshade for substantially covering an inside surface of an automotive vehicle roof.

Over the years, a variety of roller shade devices have been employed to cover windshields, side windows or back windows within automotive vehicles. One such exemplary device is disclosed within U.S. Pat. No. 2,747,929 entitled "Roller Type Sun Visor" which issued to Burkhead on May 29, 1956. However, these types of roller shades are unsightly and difficult to unroll to intermediate positions. Furthermore, these roller shades are unsuitable for use against a curved window surface. Accordingly, U.S. Pat. No. 2,855,241 entitled "Rollable Sun Visor Having A Plurality of Separately Movable Sections," which issued to Walter on Oct. 7, 1958, discloses a sun visor formed from coiled strips that can be unrolled across a curved windshield surface. While this device recognizes the curvature problem, it appears unsuitable for horizontal use and difficult to operate especially while driving an automotive vehicle.

Automotive vehicles have also employed a retractable and flexible roof having a roller and rigid hoop sticks operably attached thereto. Such a roof is disclosed within U.S. Pat. No. 1,413,424 entitled "Vehicle Body and Roof" which issued to Peczenik on Apr. 18, 1922. This roof, however, does not account for the cross car (as viewed from the rear) and windshield (as viewed from the top) curvature.

More recently, an automotive vehicle has employed a stackable set of rigid blades coupled by a flexible shade. This is disclosed within U.S. Pat. No. 4,923,244 entitled "Transparent Vehicle Roof Having Sunshade" which issued to Clenet on May 8, 1990, and U.S. Pat. No. 5,005,899 entitled "Vehicle Transparent Roof Having Manually Operable Sunshade" which also issued to Clenet on Apr. 9, 1991, both of which are incorporated by reference herewithin. It is noteworthy that this device does not disclose the blades as being straightenable and curvable depending on whether they are stowed or in a functional position.

In accordance with the present invention, the preferred embodiment of a sunshade for substantially covering an automotive vehicle roof has a plurality of roof bows and a flexible sheet spanning between the bows, all of which are slidably disposed proximate with an inside surface of the roof. In one aspect of the present invention, the bows and the flexible sheet are movable from a stowed position wherein at least one of the bows is straight, to a functional position wherein the previously straightened bow is subsequently curved. In another aspect of the present invention, an actuator is drivably coupled to a roller mechanism which, in turn, has a portion of the flexible sheet attached thereto.

The sunshade of the present invention allows for increased interior coverage of an inside surface of a transparent roof of an automotive vehicle. This increased coverage is caused by use of a roller mechanism in combination with a rollable flexible sheet and roof bows having a relatively small cross section as compared to the relatively bulky conventional blades. The present invention also provides increased roof coverage by curving one or more roof bows in one or more planes as the roof bows are moved from their straightened stowed position to their curved functional extended position. The sunshade of the present invention is also advantageous over traditional devices since the flexible sheet and roof bows can conform with the cross car curvature of the roof as well as the top view curvature of the windshield and a front header panel. Furthermore, the present invention sunshade is easily operated by the vehicle driver with minimal distraction and effort. Additional advantages and features of the present invention will become apparent from the following description and appended claims, taken in conjunction with the accompanying drawings.

DETAILED DESCRIPTION OF THE PREFERRED EMBODIMENTS

Figure 1:
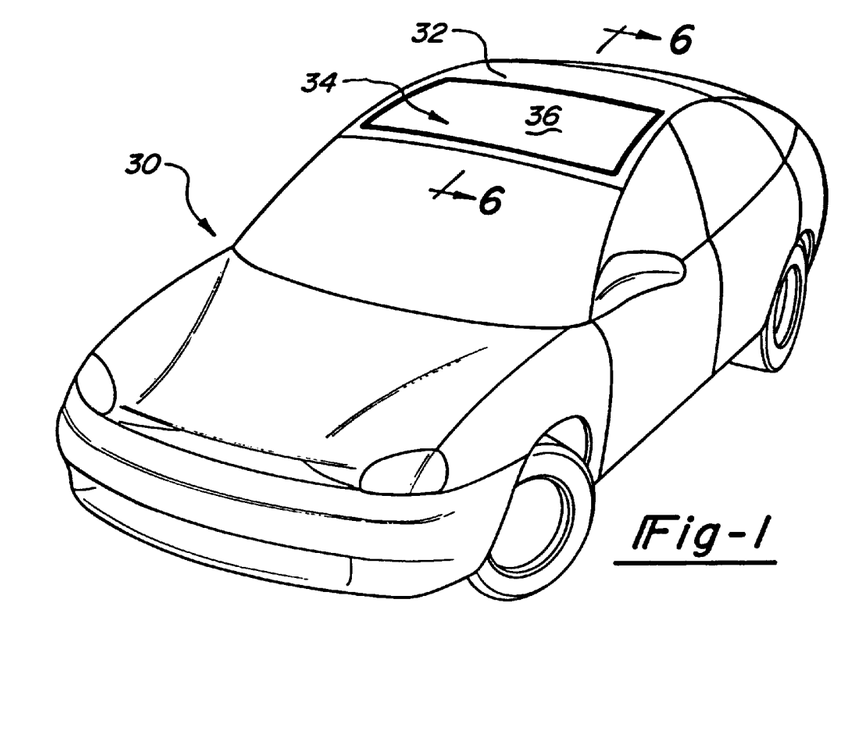
FIG. 1 is a perspective view showing an automotive vehicle having a transparent roof, sun roof, and a preferred embodiment of a sunshade of the present invention.
Figure 6:
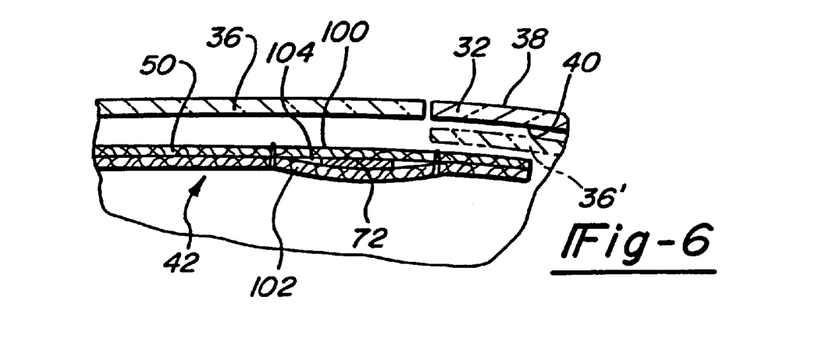
FIG. 6 is a sectional view, taken along line 6—6 of FIG. 1, showing the preferred embodiment of the present invention sunshade.

An automotive vehicle employing a sunshade of the present invention is shown in FIGS. 1 and 6. The automotive vehicle 30 preferably has a substantially transparent glass roof 32 with a conventional sunroof 34 disposed therein. Sunroof 34 is of a conventional construction and has a moveable glass panel 36. Such a sunroof is disclosed within U.S. Pat. No. 5,184,870 entitled "Raisable-Sliding Roof of Shallow Construction for Motor Vehicles" which issued to Bauhof on Feb. 9, 1993, and U.S. Pat. No. 4,671,564 entitled "Ventilating Device for a Roof Opening of Vehicles" which issued to Sumida et al. on Jun. 9, 1987, both of which are incorporated by reference herewithin. Roof 32 is defined by an outside surface 38 and an inside surface 40. A preferred embodiment of a sunshade 42 of the present invention is disposed proximate with inside surface 40 of roof 32.

Figure 2:
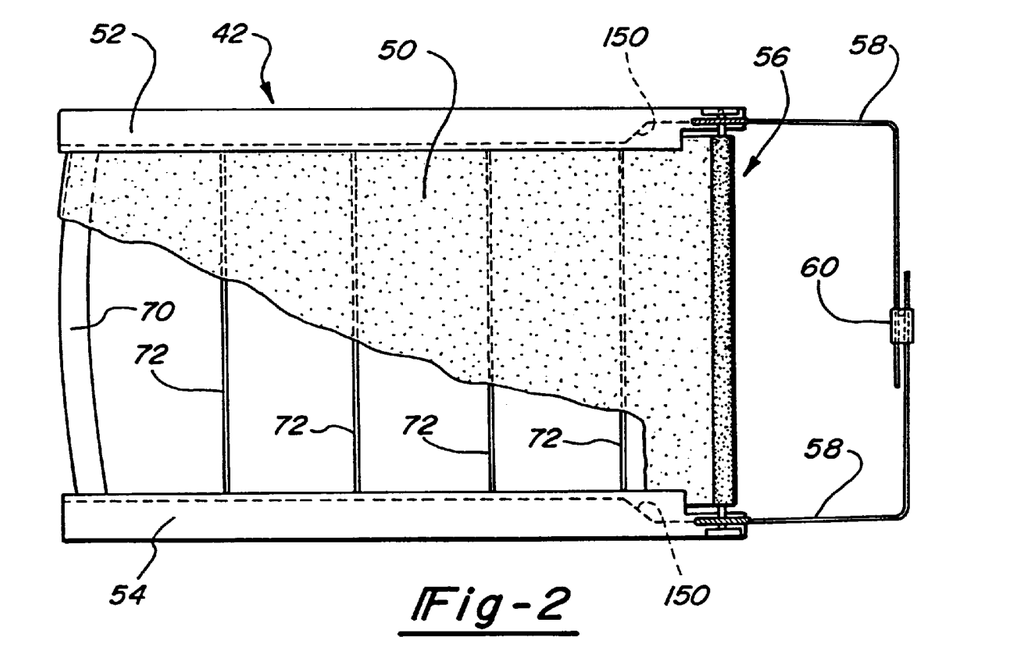
FIG. 2 is a top elevational view showing the preferred embodiment of the present invention sunshade of FIG. 1.
Figure 3:
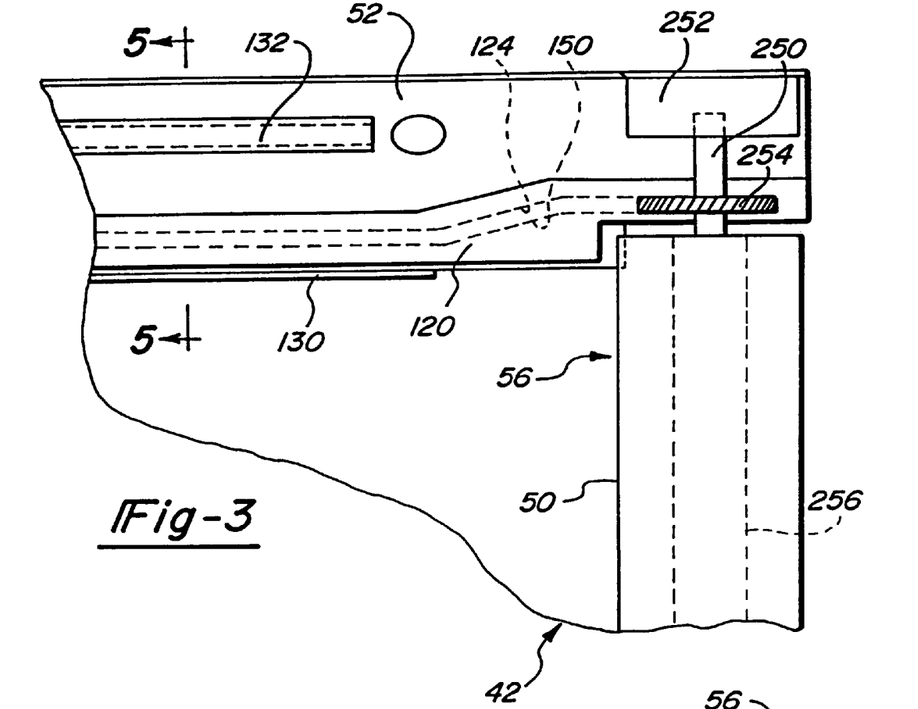
FIG. 3 is a fragmentary top elevational view of the preferred embodiment of the present invention sunshade of FIG. 2.
Figure 4:
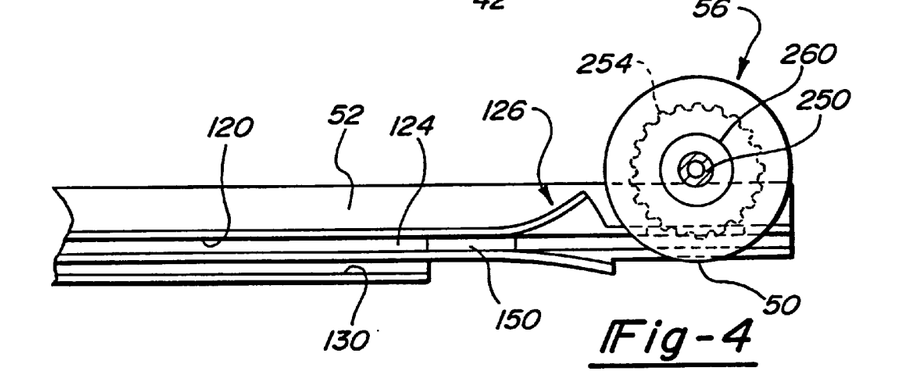
FIG. 4 is a fragmentary side elevational view showing the preferred embodiment of the present invention sunshade of FIG. 3.
Figure 5:
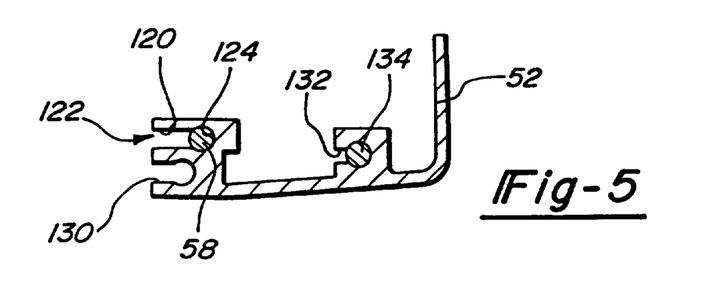
FIG. 5 is a cross sectional view, taken along line 5—5 of FIG. 3, of the preferred embodiment of the present invention sunshade.

As can be observed in FIG. 2, sunshade 42 is comprised of a plurality of roof bows, a flexible sheet 50, a first track 52, a second track 54, a roller mechanism 56, a pair of cables 58 and an actuator 60. The plurality of roof bows include a leading bow 70 and a plurality of trailing bows 72. One preferred embodiment of leading bow 70 is shown in FIG. 2. This leading bow 70 is comprised of a spring steel member with end fittings molded or pressed thereupon. Leading bow 70 is formed with a top view curve matching a front header and windshield. However, leading bow 70 is flexible in a substantially vertical direction.

Figure 9:
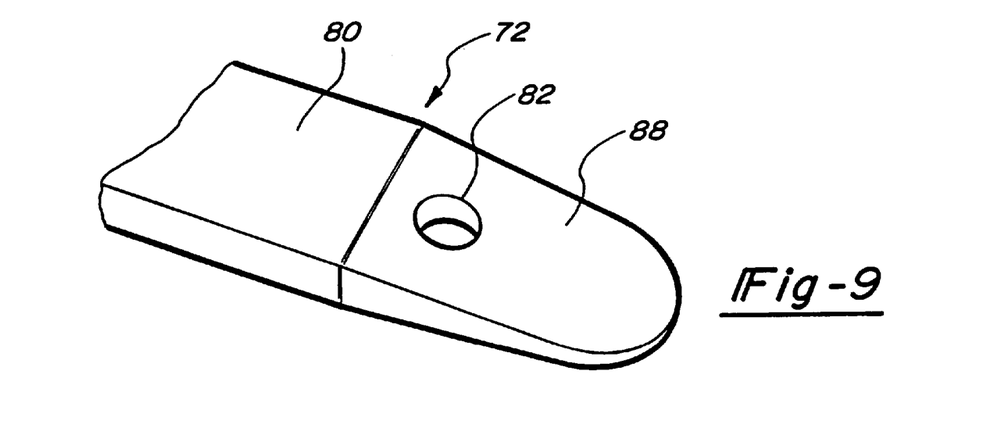
FIG. 9 is a fragmentary perspective view of an alternate embodiment roof bow employed in the present invention sunshade of FIG. 2.
Figure 10:
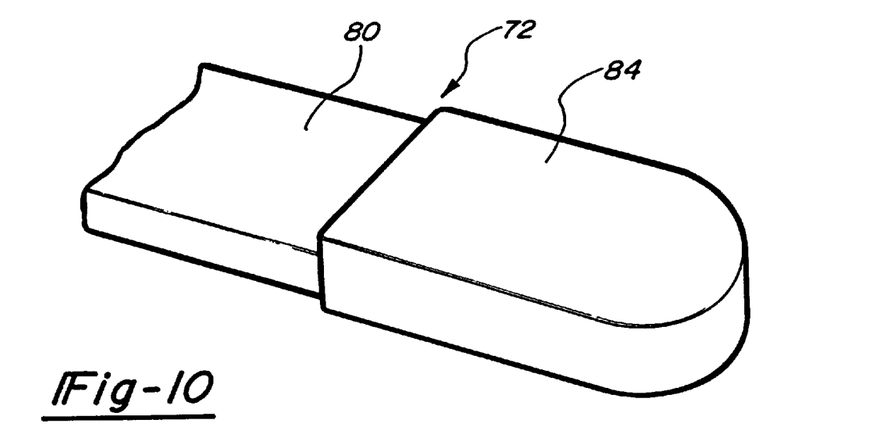
FIG. 10 is a fragmentary perspective view of the alternate embodiment roof bow of FIG. 9 having an end fitting thereon, employed in the present invention sunshade.
Figure 11:
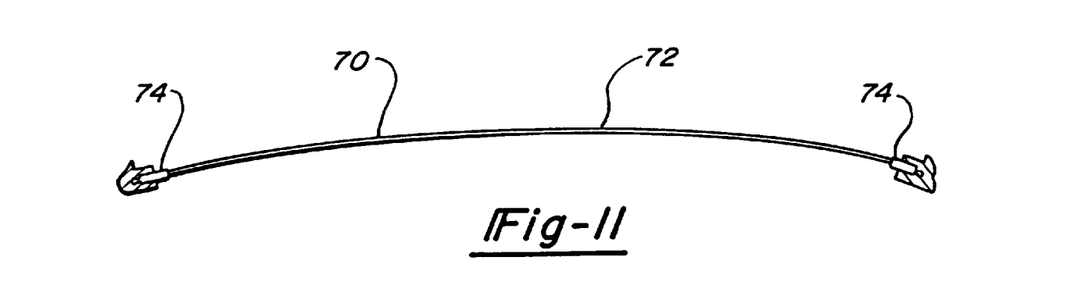
FIG. 11 is a rear elevational view, partially in section, of a second preferred embodiment of a leading roof bow of the present invention sunshade of FIG. 2, disposed in its functional position.

Referring to FIG. 11, a second preferred leading bow 70 embodiment consists of a flexible glass fiber rod 72 with a pair of nylon end fittings 74 molded or pressed upon the ends thereof. The glass fiber leading bow 70 is flexible in both a vertical and horizontal direction. As can best be seen in FIGS. 2, 7 and 8, trailing bows 72 are each preferably made from a spring steel strip 80 having a hole 82 drilled in each end thereof. A Delrin® polymeric end fitting 84 is either molded or pressed upon each end of trailing bows 72. Each end fitting 84 has a bearing surface located at 86. An alternate embodiment of the end portion of trailing bows 72 is shown in FIGS. 9 and 10. In this embodiment, each spring steel strip 80 has a tapered end portion 88 with hole 82 bored therethrough. End fitting 84 is then insert molded around each end portion 88. Of course, trailing bows 72 could be made from glass fiber rods, polymeric materials or the like.

Flexible sheet 50 can best be observed in FIG. 6. Flexible sheet 50 is comprised of an upper layer of cloth material 100 and a lower layer of cloth material 102. These layers of material 100 and 102 are sewn to each other so as to form a plurality of pockets 104 within which the roof bows 70 and 72 can be positioned. Cables 58 are hemmed into the edges of flexible sheet 50. For aesthetic reasons, upper layer of material 100 has a black color while lower layer of material 102 has the interior vehicle coloring. Of course, one skilled in the art would know that vinyl, leather or any other flexible material could be used.

The tracks 52 and 54 can be observed in FIGS. 2 through 5. Each track 52 and 54 is mounted proximate with a side rail which supports the longitudinal edges of roof 32 (see FIG. 1). It will also be appreciated that tracks 52 and 54 are symmetrically opposite such that the description of exemplary track 52 applies to both. Track 52 has a first channel 120 running in a fore and aft longitudinal direction defined by an access slot 122 and an abutting surface 124. Access slot has a flanged portion 126 expanding toward roller mechanism 56. Accordingly, end fittings 84 of leading bow 70 and trailing bows 72 are slidably disposed within channel 120. Thus, bearing surface 86 of each end fitting 84 slidably abuts against drive cable 58 riding within channel 120. The upper and lower surfaces of end fittings 84, adjacent to bearing surface 86, slide along the coincidental top and bottom surfaces of track 120. Track 52 is preferably made from a lubricous polymeric material such as nylon. An interior trim garnish molding (not shown) may be attached within a second channel 130. Furthermore, a third channel 132 is formed within track 52 within which a sunroof cable 134 can traverse.

Figures 7, 8:
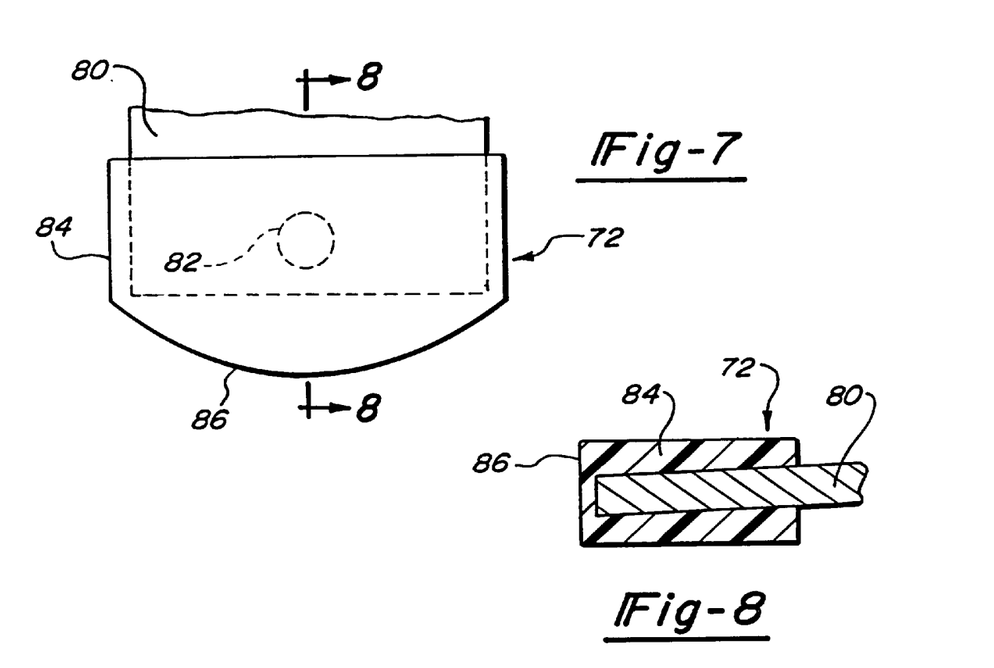
FIG. 7 is a fragmentary true view of a preferred embodiment of a roof bow employed in the present invention sunshade of FIG. 2.
FIG. 8 is a cross sectional view, taken along line 8—8 of FIG. 7, showing the preferred embodiment of the roof bow employed in the present invention sunshade.
Figure 12:
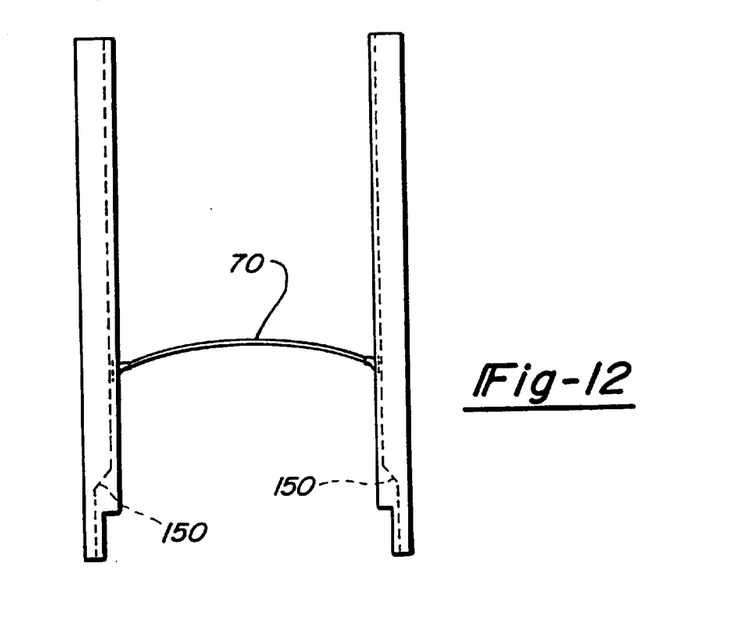
FIG. 12 is a top elevational view showing the second preferred embodiment of the leading roof bow of FIG. 11 employed in the present invention sunshade, disposed between its stowed position and its functional position.
Figure 13:
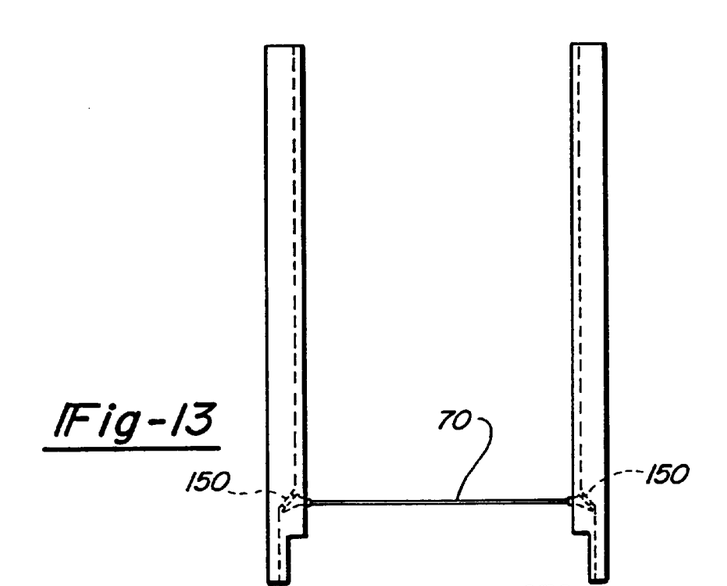
FIG. 13 is a top elevational view showing the second preferred embodiment of the leading roof bow of FIG. 11 employed in the present invention sunshade, disposed in its stowed position.

Abutting surfaces 124 of each track 52 and 54 have an angled segment 150. When bows 70 and 72 are positioned rearward of angled segment 150, they have a straight orientation, both in a crosscar and top view manner. This is shown in FIG. 13. However, when bow 70 is positioned forward of angled segment 150, it is caused to take a curved orientation in both a crosscar and top view manner. This can be observed in FIGS. 11 and 12. Simultaneously, trailing bows 72 are given a crosscar curve forward of angled segment 150. The crosscar curvature is also dictated in part by the relative angular orientation of spring steel strip 80 in relation to the surrounding end fitting 84 as is shown in FIG. 8. Thus, bows 70 and 72 can be stowed in a compact straightened manner rearward of angled segment 150 of tracks 52 and 54. Subsequently, bows 70 and 72, as well as flexible sheet 50 attached thereto, can easily conform to the curvature and sweep of roof 32 (see FIG. 1) when in the functional position shown in FIG. 2. Alternately, the angled relation between tracks 52 and 54 may be more gradual than that shown and may again widen away from each other proximate with the windshield.

It will also be appreciated that this system may be modified such that cable 58 is disposed within channel 130 or even external from track 52. It will further be appreciated that sunroof cable 134 can be totally independent from track 52.

Figure 15:
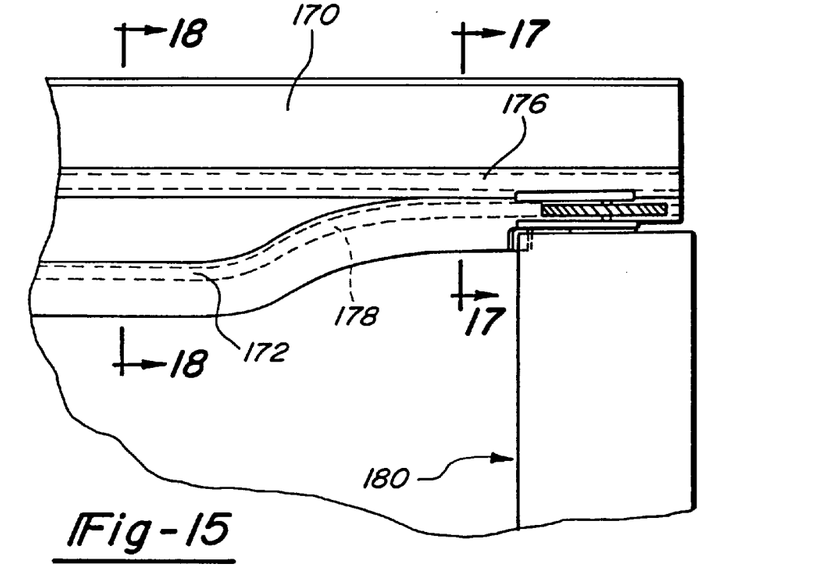
FIG. 15 is a fragmentary top elevational view showing an alternate embodiment of the sunshade of the present invention of FIG. 2.
Figure 16:
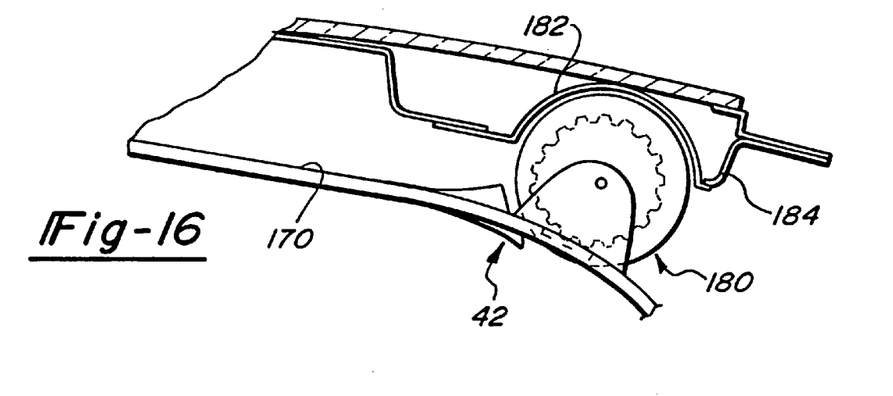
FIG. 16 is a fragmentary side elevational view, partially in section, showing the alternate embodiment of the present invention sunshade of FIG. 15.
Figure 17:
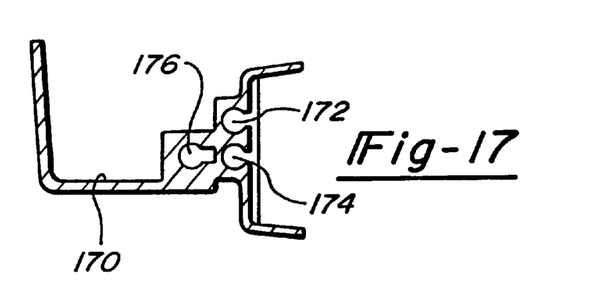
FIG. 17 is a cross sectional view, taken along line 17—17 of FIG. 15, showing an alternate embodiment track employed in the alternate embodiment of the present invention sunshade.

An alternate embodiment track 170 is shown in FIGS. 15 through 17. This track employs a first channel 172 having a more circular cross-sectional shape thereto within which roof bows 70 and 72, and cable 58 (see FIG. 2) are all slidably disposed. A second channel 174 is available to slidably support a second sunshade set of bows and a cable while a third channel 176 slidably supports a sunroof cable 134 (see FIG. 5). Channel 176 extends fore and aft further than does channel 132 (see FIG. 3) of track 52. It is also noteworthy that angled segment 178 of channel 172 is more subtle than that of track 52 (see FIG. 3). This alternate embodiment further has a roller mechanism 180 located within a depression 182 formed within a rear header panel 184. This embodiment further optimizes the compact packaging of the present invention sunshade 42.

Figure 18:
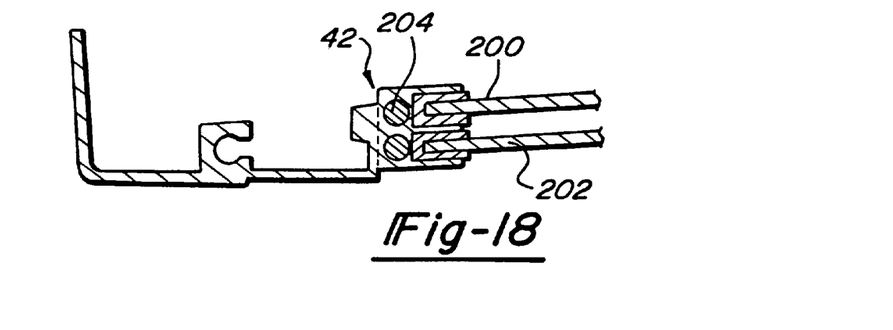
FIG. 18 is a cross sectional view, taken along line 18—18 of FIG. 15, showing the alternate embodiment track and a pair of roof bow and cable sets operating therewithin employed in the alternate embodiment of the present invention sunshade.
Figure 19:
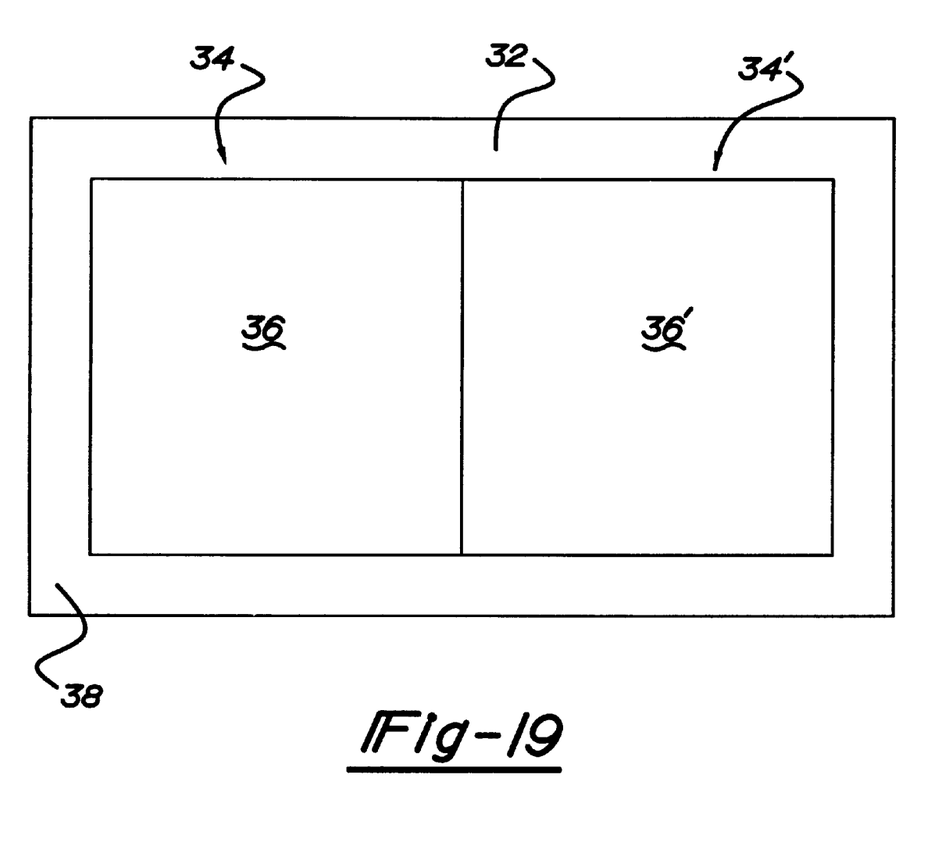
FIG. 19 is a diagrammatic top view showing an alternate embodiment multiple sunroof construction employing the present invention sunshade.

Still another alternate embodiment of sunshade 42 of the present invention is shown in FIG. 18. In this embodiment, two sets of roof bows 200 and 202 are vertically disposed adjacent with one another. Each set of roof bows 200 and 202 has a corresponding cable 204, flexible sheet (not shown) and roller mechanism (not shown) operating therewith. Such a pair of roof bow and flexible sheet sets may be desired for station wagon or multiple sunroof vehicles (See FIG. 19).

Figure 14:
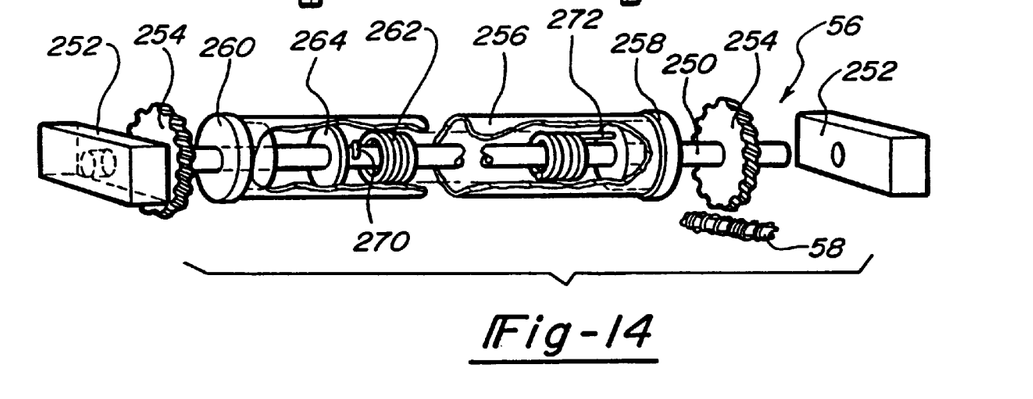
FIG. 14 is an exploded perspective view showing a preferred embodiment of a roller mechanism employed in the present invention sunshade of FIG. 2.

Roller mechanism 56 has an inner shaft 250, a pair of nylon bearing surfaces 252, a pair of helical gears 254, an outer tube 256, a first end cap 258, a second end cap 260, a torsion spring 262 and a urethane disk 264. Inner shaft 250 is preferably a ⅜ inch diameter steel tube having ends which are journalled for rotation within bearing surfaces 252. Helical gears 254 are rotatably coupled to inner shaft 250 and are each in meshed engagement with a corresponding cable 58. Cable 58 is preferably a wire-wound, flocked cloth and flexible wire core construction. Thus, each cable 58 can be operably pushed or pulled. End caps 258 and 260 are journalled for rotation about inner shaft 250. End caps are preferably made from a nylon material and are press fit onto the ends of an aluminum outer tube 256. Additionally, outer tube 256 is crimped onto each end cap 258 and 260. Torsion spring 262 has a first end 270 coupled to inner shaft 250 and has a second end 272 secured to end cap 258. Thus, torsion spring 262 maintains flexible sheet 50 (see FIG. 2) in a taut manner when flexible sheet 50 is in its functional position. Also, torsion spring 262 serves to prevent undesirable rattles within roof bows 70 and 72, and flexible sheet 50 when in their stowed position wrapped around roller mechanism 56 (see FIG. 4). Torsion spring 262 further serves to accommodate the change in angular velocity of the tube 256 as material rolls on and off the tube as compared to the relatively constant linear velocity of cable 58. Disk 264 serves to maintain the appropriate spacing between inner shaft 250 and outer tube 256. Of course, roller mechanism 56 may only provide a single helical gear 254.

Actuator 60 is preferably remotely located under a package shelf 371 (See FIG. 1) in order to maximize head room near the roof. Actuator 60 is a fractional horsepower direct current electric motor but may alternately be a hand-actuated crank or other driving means. The vehicle driver simply depresses an electric button (not shown) located on an instrument panel to energize actuator 60 which, in turn, pushes or pulls cables 58 (depending on whether a pulley arrangement is employed to reverse the direction of cable pull). Cables 58 accordingly push leading bow 70 along tracks 52 and 54 which act to straighten leading bow 70 when in its stowed position and curve leading bow 70 when in its functional position. Trailing bows 72 and flexible sheet 50 are pulled therebehind against the forces created by torsion spring 262 of roller mechanism 56 which pulls on a trailing edge of flexible sheet 50. The vehicle driver may selectively retract bows 70 and 72, and flexible sheet 50 by again depressing a switch which reverses the driving rotation of actuator 60. Actuator 60 thereby pulls cables 58 which, in turn, rotate helical gears 254 of roller mechanism 56 so as to wrap flexible sheet 50 and the straightened bows 72 and 70 around outer tube 256 of roller mechanism 56. Alternatively, actuator 60 may be directly connected to leading bow 70, tracks 52 and 54, or roller mechanism 56 without cables 58.

While the preferred embodiment of a sunshade has been disclosed, it will be appreciated that various modifications may be made without departing from the present invention. For example, an actuator may be positioned at an end of the tracks opposite from a roller mechanism, Furthermore, a roller mechanism may be disposed proximate with a side rail of the vehicle while a pair of tracks run in a crosscar manner. A plurality of rollable or curvable sunblocking roof bows may also be employed without use of a flexible sheet spanning therebetween. Moreover, a set of stackable roof bows may be used without a roller mechanism as long as the roof bows are selectively curvable and straightenable. A plurality of roof bows may also be attached to a single or multiple tracks or other retention devices by a variety of slidable attachment means. While various materials have been disclosed in an exemplary fashion, many other materials may of course be employed. It is intended by the following claims to cover these and any other departures from the disclosed embodiments which fall within the true spirit of this invention.

The invention claimed is:

1. A sunshade assembly for use with an automotive vehicle having a roof, said sunshade comprising:

a plurality of roof bows operably slidable adjacent an inside surface of said roof;

said plurality of bows being movable from a stowed position where at least one of said plurality of bows is straight, to a functional position where said at least one of said plurality of bows is curved in at least one plane;

at least one elongated member, said bows being coupled to said elongated member; and a leading bow having a curved shape when viewed from above the vehicle and when said leading bow is located in said functional position.

2. The sunshade of claim 1 further comprising:

a flexible sheet spanning between said plurality of bows.

3. The sunshade of claim 2 further comprising:

a roller mechanism attached to said flexible sheet, said flexible sheet being wrappable around said roller mechanism when said flexible sheet is in said stowed position.

4. The sunshade of claim 3 further comprising:

a cable; and an actuator driving said cable in a first direction to move said plurality of bows and said flexible sheet from said stowed position to said functional position.

5. The sunshade of claim 4 wherein:

said actuator alternately drives said cable in a reversible direction to rotate said roller mechanism thereby moving said plurality of bows and said flexible sheet from said functional position to said stowed position.

6. The sunshade of claim 5 wherein said roller mechanism includes:

an inner shaft having ends;

a pair of bearing surfaces journalling ends of said inner shaft for rotation;

a gear coupled for rotation with said inner shaft, said cable rotating said gear;

an outer tube coaxially surrounding said inner shaft, said flexible sheet attached to said outer tube; and a torsion spring coupling said outer tube to said inner shaft.

7. The sunshade of claim 3 wherein:

at least one of said plurality of bows is located adjacent a circumference of said roller mechanism and oriented longitudinally when in said stowed position.

8. The sunshade of claim 1 wherein said at least one elongated member includes:
- a first track having a channel extending in a substantially fore and aft direction; and
- a second track having a channel extending in a substantially fore and aft direction;
- each of said plurality of bows having ends slidably positionable in said channels.

9. The sunshade of claim 8 wherein:
- said channels of said tracks are angled in relation to one another so as to cause said at least one of said plurality of bows to straighten and curve when moving from said stowed position to said functional position.

10. The sunshade of claim 9 wherein:
- said channels of said tracks each have an access slot for accepting said ends of said plurality of bows, each of said channels further have an abutting surface facing said access slot, and said abutting surfaces are angled toward each other so as to curve said at least one of said plurality of bows the ends of which slidably ride upon a cable movably adjacent to said abutting surfaces.

11. The sunshade of claim 8 further comprising:
- a cable movably running in said tracks for pulling at least one of said plurality of roof bows from said stowed position to said functional position.

12. The sunshade of claim 2 further comprising:
- a roller mechanism attached to said flexible sheet and oriented substantially parallel to said bows.

13. The sunshade of claim 2 wherein:
- said roof is made from a substantially transparent material; and
- said flexible sheet is positioned below a majority of said inside surface of said roof when in said functional position.

14. The sunshade of claim 1 further comprising a sunroof having a movable transparent panel selectively located above said plurality of bows, said panel being movable to a tilted vent position.

15. The sunshade of claim 1 wherein:
- said at least one of said plurality of bows curves in a substantially horizontal plane.

16. The sunshade of claim 1 wherein:
- said at least one of said plurality of bows curves in a substantially vertical plane.

17. A method for operating a sunshade having a plurality of roof bows located below a substantially horizontal plane defined by an automotive vehicle roof, said method comprising:
- (a) moving said plurality of roof bows from a stowed position to a functional position;
- (b) curving at least one of said plurality of roof bows such that at least one of said plurality of roof bows is curved when in said functional position;
- (c) moving said plurality of roof bows from said functional position to said stowed position;
- (d) straightening said at least one of said plurality of roof bows such that said at least one of said plurality of roof bows is straight when in said stowed position; and
- (e) flexing at least a leading one of said roof bows, said leading one of said roof bows being located adjacent a leading edge of said sunshade.

18. The method of claim 25 further comprising:
- (a) attaching a first track having a channel to said vehicle;
- (b) attaching a second track having a channel to said vehicle; and
- (c) sliding ends of said plurality of bows in said channels.

19. A method for operating a sunshade having a plurality of roof bows located below a substantially horizontal plane defined by an automotive vehicle roof, said method comprising:
- (a) moving said plurality of roof bows from a stowed position to a functional position; (b) curving at least one of said plurality of roof bows such that said at least one of said plurality of roof bows is curved when in said functional position;
- (c) moving said plurality of roof bows from said functional position to said stowed position;
- (d) straightening said at least one of said plurality of roof bows such that said at least one of said plurality of roof bows is straight when in said stowed position;
- (e) flexing at least a leading one of said roof bows;
- (f) attaching a first track having a channel to said vehicle;
- (g) attaching a second track having a channel to said vehicle; and
- (h) sliding ends of said plurality of bows in said channels; and
- (i) angling said channels of said tracks in relation to one another thereby causing said at least one of said plurality of bows to straighten and curve when moving from said stowed position to said functional position.

20. The method of claim 17 further comprising rolling at least a majority of said plurality of bows around a roller mechanism when moving said plurality of bows from said functional position to said stowed position.

21. The method of claim 17 further comprising spanning a flexible sheet between said plurality of bows and rolling said sheet around a roller when said sheet is moved to a stowed position.

22. A sunroof assembly comprising:
- a first sunroof window movable between a closed position and an open position;
- a second sunroof window movable between a closed position and an open position;
- a plurality of roof bows;
- a flexible sunshade spanning between said bows;
- a track located substantially below said first sunroof window;
- a roller mechanism axially located substantially perpendicular to said track, said flexible sunshade being affixed to said roller mechanism; and
- an electric motor energizable to cause said set of bows and said flexible sunshade to move between a stowed position and a functional position, a majority of said flexible sunshade operably being rolled around at least a portion of said roller mechanism when in said stowed position.

23. In combination, a sunroof assembly and a vehicle, the combination comprising:
- a sunroof window movable between a closed position and an open position;
- a plurality of roof bows;
- a flexible sunshade spanning between said bows, said flexible sunshade having an edge;
- a track located substantially below said sunroof window;
- a roller mechanism axially located substantially perpendicular to said track, said edge of said flexible sunshade being affixed to said roller mechanism;

an electric motor energizable to cause said bows and said flexible sunshade to move between a stowed position and a functional position, a majority of said flexible sunshade operably being rolled around at least a portion of said roller mechanism when in said stowed position; and a substantially horizontal shelf, said electric motor being located substantially below said shelf.

24. The combination of claim 22 further comprising a cable coupling said electric motor to at least one of said bows, said electric motor operatively pushing and pulling said cable.

25. The combination of claim 22 further comprising polymeric end fittings molded upon ends of said bows, each of said end fittings having a substantially rectangular cross sectional shape.

26. The combination of claim 22 wherein a hole is substantially vertically disposed within each of said ends of said plurality of bows.

27. The combination of claim 22 wherein each of said ends of said bows have a rounded top view shape.

28. The combination of claim 22 wherein said flexible sunshade is a vinyl sheet having pockets for receiving said plurality of bows.

29. The sunroof assembly of claim 22 further comprising a second flexible sunshade movable below at least one of said sunroof windows.

30. The sunroof assembly of claim 29 further comprising a second elongated track extending substantially parallel to said first track, wherein both of said sunshades are slidably coupled to said tracks.

31. The sunroof assembly of claim 22 wherein at least a majority of said bows are flexible in a vertical direction.

32. The combination of claim 23 wherein said shelf is a package shelf.

* * * * *

UNITED STATES PATENT AND TRADEMARK OFFICE
CERTIFICATE OF CORRECTION

PATENT NO. : 6,161,893
DATED : December 19, 2000
INVENTOR(S) : Kip A. Ewing et al.

Page 1 of 1

It is certified that error appears in the above-identified patent and that said Letters Patent is hereby corrected as shown below:

<u>Title page, Second page, Column 1,</u>
Under U.S. Patent Documents, reference 4,175,784, "Schaltzler, et al" should be
-- Schatzler et al --.

<u>Column 7,</u>
Line 66, "25" should be -- 17 --.

Signed and Sealed this

Twenty-eighth Day of August, 2001

Attest:

NICHOLAS P. GODICI
*Attesting Officer*  *Acting Director of the United States Patent and Trademark Office*